United States Patent
Zhang et al.

(10) Patent No.: US 12,487,327 B2
(45) Date of Patent: Dec. 2, 2025

(54) RADAR SIGNAL PROCESSING METHOD, RADAR SIGNAL PROCESSING DEVICE, RADIO SIGNAL PROCESSING METHOD, INTEGRATED CIRCUIT, RADIO DEVICE, AND DEVICE

(71) Applicant: CALTERAH SEMICONDUCTOR TECHNOLOGY (SHANGHAI) CO., LTD., Shanghai (CN)

(72) Inventors: Yanqun Zhang, Shanghai (CN); Yan Zhu, Shanghai (CN)

(73) Assignee: Calterah Semiconductor Technology (Shanghai) Co., Ltd., Shanghai (CN)

( * ) Notice: Subject to any disclaimer, the term of this patent is extended or adjusted under 35 U.S.C. 154(b) by 316 days.

(21) Appl. No.: 18/306,232

(22) Filed: Apr. 24, 2023

(65) Prior Publication Data
US 2023/0305106 A1    Sep. 28, 2023

Related U.S. Application Data

(63) Continuation of application No. PCT/CN2022/112208, filed on Aug. 12, 2022.

(30) Foreign Application Priority Data

Dec. 29, 2021 (CN) .......... 202111682290.9
Jan. 5, 2022 (CN) .......... 202210009395.6

(51) Int. Cl.
*G01S 7/35* (2006.01)
*G01S 13/58* (2006.01)

(52) U.S. Cl.
CPC ............ *G01S 7/356* (2021.05); *G01S 13/583* (2013.01)

(58) Field of Classification Search
CPC .......... G01S 7/038; G01S 7/356; G01S 13/58; G01S 13/583
See application file for complete search history.

(56) References Cited

U.S. PATENT DOCUMENTS 6,297,764 B1 * 10/2001 Wormington ......... G01S 7/4021
                                                      342/99
6,664,920 B1 * 12/2003 Mott .................... G01S 13/343
                                                      342/129

(Continued)

FOREIGN PATENT DOCUMENTS

CN    102023292 A    4/2011
CN    103760541 A    4/2014

(Continued)

OTHER PUBLICATIONS

Calterah Semiconductor Technology (shanghai) Co., Ltd., Notification to Grant Patent Right for Invention with English translation, CN 202210009395.6, Mar. 16, 2024, 8 pgs.

(Continued)

Primary Examiner — Peter M Bythrow
(74) Attorney, Agent, or Firm — USCH Law, PC

(57) ABSTRACT

The radar signal processing method includes: after an echo signal is mixed based on a local oscillator signal, and digital signal processing is performed to obtain a signal to be processed, the signal to be processed is subtracted based on a datum difference frequency signal to obtain a target signal, and a travelling speed of a target relative to a radar and/or a distance of the target relative to the radar is determined according to the target signal. Since the datum differential frequency signal is a signal obtained by mixing a leakage signal based on the local oscillator signal and performing the digital signal processing in a target free environment. Therefore, subtracting the signal to be processed based on the datum differential frequency signal can effectively reduce (Continued)

the content of the leakage signal in the signal to be processed, thereby improving the accuracy of the measurement results.

19 Claims, 6 Drawing Sheets

(56) References Cited

U.S. PATENT DOCUMENTS

| | | | | |
|---|---|---|---|---|
| 6,704,349 | B1* | 3/2004 | Masenten | H04B 1/123 375/346 |
| 7,772,997 | B2* | 8/2010 | Frederick | H04L 27/0014 235/375 |
| 7,899,142 | B2* | 3/2011 | Hayashi | H04B 1/525 455/296 |
| 8,175,535 | B2* | 5/2012 | Mu | H03F 1/02 455/283 |
| 10,382,085 | B2* | 8/2019 | Choi | H04L 5/14 |
| 11,047,952 | B2* | 6/2021 | Zhang | G01S 13/343 |
| 11,555,884 | B2* | 1/2023 | Park | G01S 13/34 |
| 2009/0213770 | A1* | 8/2009 | Mu | H04B 1/123 370/281 |
| 2010/0127915 | A1* | 5/2010 | Klotzbuecher | G01S 7/35 342/112 |
| 2011/0243202 | A1* | 10/2011 | Lakkis | H04B 1/525 375/219 |
| 2015/0036773 | A1* | 2/2015 | Lakkis | H04B 1/525 375/351 |
| 2015/0276929 | A1* | 10/2015 | Li | G01S 13/58 342/112 |
| 2017/0153318 | A1* | 6/2017 | Melzer | G01S 13/343 |
| 2017/0170560 | A1* | 6/2017 | Ookawa | G01S 13/931 |
| 2018/0074168 | A1* | 3/2018 | Subburaj | G01S 7/354 |
| 2020/0003866 | A1* | 1/2020 | Bauduin | G01S 7/354 |
| 2020/0116822 | A1* | 4/2020 | Park | G01S 13/34 |
| 2021/0109191 | A1* | 4/2021 | Park | G01S 7/354 |
| 2021/0149018 | A1* | 5/2021 | Elad | G01S 7/35 |
| 2021/0149037 | A1* | 5/2021 | Choi | G01S 13/34 |
| 2021/0173046 | A1* | 6/2021 | Regani | G01S 13/44 |
| 2021/0364619 | A1* | 11/2021 | Landsberg | G01S 13/343 |

FOREIGN PATENT DOCUMENTS

| | | |
|---|---|---|
| CN | 106443658 A | 2/2017 |
| CN | 108414989 A | 8/2018 |
| CN | 109581348 A | 4/2019 |
| CN | 109932695 A | 6/2019 |
| CN | 110286373 A | 9/2019 |
| CN | 110308426 A | 10/2019 |
| CN | 111105509 A | 5/2020 |
| CN | 111352102 A | 6/2020 |
| CN | 112379336 A | 2/2021 |
| CN | 112654895 A | 4/2021 |
| CN | 113109779 A | 7/2021 |
| CN | 114355328 A | 4/2022 |
| DE | 3639500 A1 | 6/1988 |
| EP | 3835810 A1 | 6/2021 |
| WO | 2021147075 A1 | 7/2021 |

OTHER PUBLICATIONS

Calterah Semiconductor Technology (shanghai) Co., Ltd., International Search Report with English translation, PCT/CN2022/112208, Nov. 10, 2022, 8 pgs.

Calterah Semiconductor Technology (Shanghai) Co., Ltd., Extended European Search Reprt, EP 22798686.6, Dec. 9, 2024, 10 pgs.

Qiqing Xu, "Fundamentals of electrical and electronic technology", China Machine Press, p. 157-p. 158, Oct. 31, 2021, 4 pgs.

Calterah Semiconductor Technology (shanghai) Co.,Ltd., CN Second Office Action with English translation, CN 2022100093956, Nov. 28, 2023, 23 pgs.

* cited by examiner

RADAR SIGNAL PROCESSING METHOD, RADAR SIGNAL PROCESSING DEVICE, RADIO SIGNAL PROCESSING METHOD, INTEGRATED CIRCUIT, RADIO DEVICE, AND DEVICE

CROSS REFERENCE TO RELATED APPLICATIONS

The present disclosure is a continuation of PCT Patent Application No. PCT/CN2022/112208, entitled "RADAR SIGNAL PROCESSING METHOD, RADAR SIGNAL PROCESSING DEVICE, RADIO SIGNAL PROCESSING METHOD, INTEGRATED CIRCUIT, RADIO DEVICE, AND DEVICE" filed Aug. 12, 2022, which claims priority to Chinese patent disclosure No. 202111682290.9, entitled "RADAR SIGNAL PROCESSING METHOD, RADAR SIGNAL PROCESSING DEVICE, RADIO SIGNAL PROCESSING METHOD, INTEGRATED CIRCUIT, RADIO DEVICE, AND DEVICE," filed Dec. 29, 2021, and to Chinese patent disclosure No. 202210009395.6, entitled "RADAR SIGNAL PROCESSING METHOD, RADAR SIGNAL PROCESSING DEVICE, RADIO SIGNAL PROCESSING METHOD, INTEGRATED CIRCUIT, RADIO DEVICE, AND DEVICE," filed Jan. 5, 2022, each of which is incorporated by reference herein in its entirety.

TECHNICAL FIELD

The present disclosure relates to the technical field of signal processing, and in particular to a radar signal processing method, a radar signal processing device, a radio signal processing method, an integrated circuit, and a device.

BACKGROUND

A frequency modulated continuous wave (FMCW) radar, as a sensor that can provide accurate range measurement and ultra-high range resolution, has been widely applied to many fields in recent years. The basic process of distance measurement for FMCW radar is basically the same as that for other types of radars, that is, a transmitting antenna transmits outgoing signals, which generate echo signals after encountering reflectors, and a receiving antenna receives the echo signals. Finally, a distance measurement is completed based on the time relationship calculated by the frequency difference between the outgoing signals and the echo signals.

In practical disclosure, it is inevitable that the FMCW radar leaks the outgoing signals directly from the transmitting antenna to the receiving antenna. As a result, the echo signals received by the receiving antenna of the FMCW radar includes not only effective echo signals, but also leakage signals. In general, the energy of the leakage signals is very strong, so the accuracy of the measurement results will be seriously affected.

By widening the distance between the transmitting antenna and the receiving antenna and installing metal isolation plates, the isolation between the transmitting antenna and the receiving antenna is improved, to reduce the energy of signals leakage from the transmitting antenna to the receiving antenna. The isolation between the transmitting antenna and the receiving antenna can be increased by 6 dB every time the distance between the transmitting antenna and the receiving antenna is widened. Although this can solve the problem of leaking signal interference to a certain extent, widening the distance between the transmitting antenna and the receiving antenna and adding isolation plates will inevitably increase the size, hardware cost and operation and maintenance cost of the radar.

SUMMARY

In view of this, an object of the present disclosure is to provide a radar signal processing method, a radar signal processing device, a radio signal processing method, an integrated circuit, a radio device, and a device, to not only improve the accuracy of the measurement results, but also reduce the impact of the leakage signal on the measurement results by subtracting the signal to be processed through the reference differential frequency signal without widening the distance between antennas and adding isolation plates, so that the size of the original radar is prevented from being changed (or the size of the radar is even further reduced), and the hardware cost, and operation and maintenance cost of the radar are prevent from being increased. The specific solutions ae as follows.

In a first aspect, a radar signal processing method is provided according to the present disclosure, the radar signal processing method includes:
mixing an echo signal based on a local oscillator signal, and performing digital signal processing to obtain a signal to be processed;
subtracting the signal to be processed based on a datum difference frequency signal to obtain a target signal; and,
determining a travelling speed of a target relative to a radar and/or a distance of the target relative to the radar according to the target signal;
where the datum differential frequency signal is a signal obtained by mixing a leakage signal based on the local oscillator signal and performing the digital signal processing in a target free environment.

In some embodiments, the datum differential frequency signal is characterized in a form of time domain signal;
subtracting the signal to be processed based on the datum difference frequency signal to obtain the target signal includes:
calculating an amplitude difference between the signal to be processed and the datum differential frequency signal at multiple same times to obtain multiple first subtracted data;
taking each of the multiple first subtracted data as signal data of the signal to be processed at a corresponding time, and taking the signal to be processed that has been subtracted as the target signal.

In some embodiments, determining the travelling speed of the target relative to the radar and/or the distance of the target relative to the radar according to the target signal includes:
performing two-dimensional fast Fourier transform (2D FFT) on the target signal to obtain a first transformation result;
determining the travelling speed of the target relative to the radar and/or the distance of the target relative to the radar according to the first transformation result.

In some embodiments, the datum differential frequency signal is characterized by transformation result obtained after range FFT is performed on time domain waveform of the datum differential frequency signal;
subtracting the signal to be processed based on the datum difference frequency signal to obtain the target signal includes:

performing range FFT on the signal to be processed to obtain a first preprocessed signal;

calculating complex difference between the first preprocessed signal and the datum frequency difference signal at multiple same frequency points to obtain multiple second subtracted data;

taking each of the multiple second subtracted data as signal data of the first preprocessed signal at a corresponding frequency point, and taking the first preprocessed signal that has been subtracted as the target signal.

In some embodiments, determining the travelling speed of the target relative to the radar and/or the distance of the target relative to the radar according to the target signal includes:

performing doppler FFT on the target signal to obtain a second transformation result;

determining the travelling speed of the target relative to the radar and/or the distance of the target relative to the radar according to the second transformation result.

In some embodiments, the datum differential frequency signal is characterized by transformation result obtained after 2D FFT is performed on time domain waveform of the datum differential frequency signal;

subtracting the signal to be processed based on the datum difference frequency signal to obtain the target signal includes:

performing 2D FFT on the signal to be processed to obtain a second preprocessed signal;

calculating complex difference between the second preprocessed signal and the datum frequency difference signal at multiple same frequency points to obtain multiple third subtracted data;

taking each of the multiple third subtracted data as signal data of the first preprocessed signal at a corresponding frequency point, and taking the second preprocessed signal that has been subtracted as the target signal.

In some embodiments, the radar signal processing method provided according to any one of the first aspect of the present disclosure further includes:

determining an azimuth of the target according the travelling speed of the target relative to the radar and/or the distance of the target relative to the radar.

In a second aspect, a radar signal processing device is provided according to the present disclosure, the radar signal processing device includes:

an obtaining unit, configured to mix an echo signal based on a local oscillator signal, and performing digital signal processing to obtain a signal to be processed;

a subtracting unit, configured to subtract the signal to be processed based on a datum difference frequency signal to obtain a target signal;

a first determining unit, configured to determine a travelling speed of a target relative to a radar and/or a distance of the target relative to the radar;

where the datum differential frequency signal is a signal obtained by mixing a leakage signal based on the local oscillator signal and performing the digital signal processing in a target free environment.

In a third aspect, a radio signal processing method is provided according to the present disclosure, the radio signal processing method includes:

performing a preset digital signal processing operation on a first received signal to obtain a signal to be processed;

subtracting the signal to be processed based on a reference difference frequency signal to obtain a target signal; and, determining information of a target and/or realizing wireless communication based on the target signal;

where the reference differential frequency signal is a signal obtained by performing the preset digital signal processing operation on a second received signal in a preset specific environment.

In some embodiments, the first received signal is an echo signal, and the radio signal processing method includes:

mixing an echo signal based on a local oscillator signal, and performing digital signal processing to obtain a signal to be processed;

subtracting the signal to be processed based on a reference difference frequency signal to obtain a target signal; and, determining information of a target and/or realizing wireless communication based on the target signal;

where the reference differential frequency signal is a signal obtained by mixing the second received signal based on the local oscillator signal and performing the preset digital signal processing in the preset specific environment.

In some embodiments, the preset digital signal processing operation includes an analog-to-digital conversion operation, a sampling operation, a range FFT operation, a doppler FFT operation, and a CFAR operation performed sequentially;

where between any two operations of the sampling operation, the range FFT operation, the doppler FFT operation, and the CFAR operation, the target signal is obtained by subtracting the signal to be processed based on the reference difference frequency signal.

In some embodiments, the information of the target includes at least one of distance, velocity, angle, size, shape, surface roughness, dielectric property, and motion path.

In some embodiments, the preset specific environment is a target free environment or an environment with a specific target.

In a fourth aspect, an integrated circuit is provided according to the present disclosure, the integrated circuit includes:

a storage module, configured to store a datum differential frequency signal or a reference differential frequency signal in advance;

a digital signal processing module, configured to call the datum differential frequency signal from the storage module to perform the radar signal processing method according to any one of the first aspect of the present disclosure to eliminate signal leakage interference, or call the reference differential frequency signal from the storage module to perform the radar signal processing method according to any one of the third aspect of the present disclosure to eliminate specific target signals and/or interference signals.

In some embodiments, the integrated circuit is a millimeter wave radar chip.

In a fifth aspect, a radio device is provided according to the present disclosure, the radio device includes:

a carrier;

an integrated circuit, where the integrated circuit is the integrated circuit according to the fourth aspect of the present disclosure, and the integrated circuit is arranged on the carrier; and an antenna, where the antenna is arranged on the carrier, or the antenna is integrated with the integrated circuit to form an integrated device, and the integrated device is arranged on the carrier;

the integrated circuit is connected to the antenna, to transmit and receive radio signals.

In a sixth aspect, a device is provided according to the present disclosure, the device includes:

device main body; and a radio device, where the radio device is the radio device according to the fifth aspect of the present disclosure, and the radio device is arranged on the device main body;

where the radio device is configured to perform target detection and/or communication.

In the radar signal processing method provided according to the present disclosure, after an echo signal is mixed based on a local oscillator signal, and digital signal processing is performed to obtain a signal to be processed, the signal to be processed is subtracted based on a datum difference frequency signal to obtain a target signal, and a travelling speed of a target relative to a radar and/or a distance of the target relative to the radar is determined according to the target signal. Since the datum differential frequency signal is a signal obtained by mixing a leakage signal based on the local oscillator signal and performing the digital signal processing in a target free environment, that is, the datum differential frequency signal can represent the strength of the leakage signal in the actual measurement process. Therefore, subtracting the signal to be processed based on the datum differential frequency signal can effectively reduce the content of the leakage signal in the signal to be processed, a proportion of effective echo signal in the target signal is larger, and the accuracy of the measurement results based on the target signal is higher. That is to say, the radar signal processing method provided according to the present disclosure can reduce the impact of the leakage signal on the measurement result, improve the accuracy of the measurement result, the hardware cost, and operation and maintenance cost of the radar can be prevented from being increased while preventing the distance between antennas from being increased and preventing isolation plates from being added.

BRIEF DESCRIPTION OF THE DRAWINGS

For more clearly illustrating embodiments of the present disclosure or the technical solutions in the conventional technology, drawings referred to for describing the embodiments or the conventional technology will be briefly described hereinafter. Apparently, drawings in the following description are only examples of the present disclosure, and for the person skilled in the art, other drawings may be obtained based on the set drawings without any creative efforts.

DETAILED DESCRIPTION OF THE EMBODIMENTS

Figure 1:
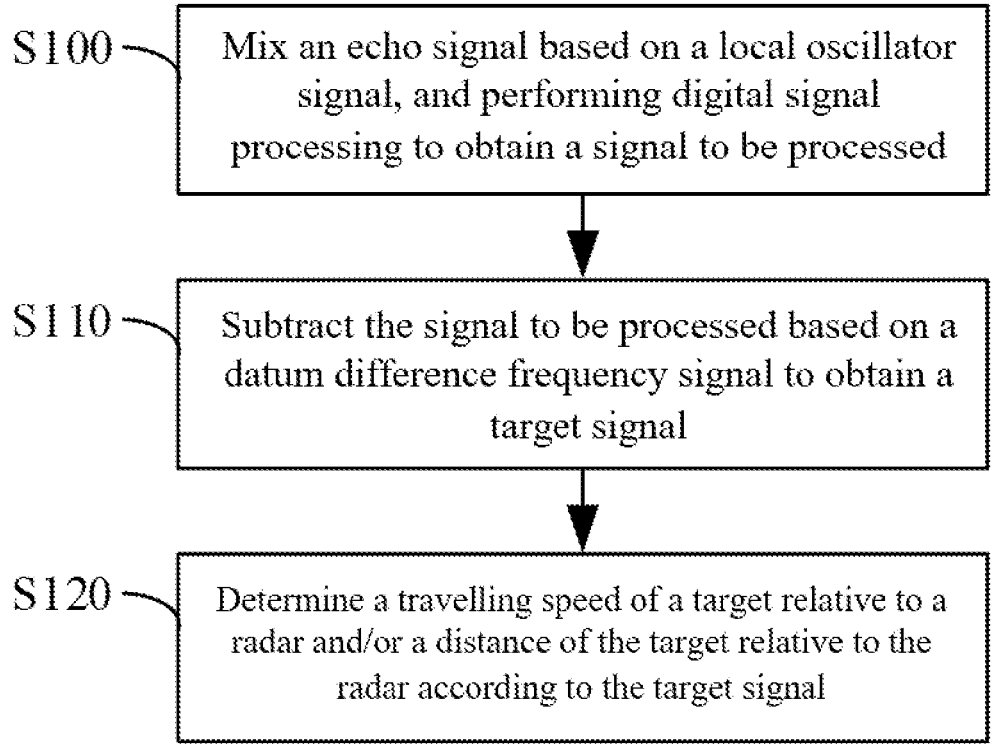
FIG. 1 is a flowchart of a radar signal processing method provided according to an embodiment of the present disclosure.

The object of the present disclosure is to provide a radar signal processing method, a radar signal processing device, a radio signal processing method, an integrated circuit, a radio device, and a device, to not only improve the accuracy of the measurement results, but also reduce the impact of the leakage signal on the measurement results by subtracting the signal to be processed through the reference differential frequency signal without widening the distance between antennas and adding isolation plates, so that the size of the original radar is prevented from being changed (or the size of the radar is even further reduced), and the hardware cost, and operation and maintenance cost of the radar are prevent from being increased.

In the radar signal processing method provided according to the embodiments of the present disclosure, after the echo signal is mixed based on the local oscillator signal, and digital signal processing is performed to obtain the signal to be processed, the signal to be processed is subtracted based on a datum difference frequency signal to obtain the target signal, and the travelling speed of the target relative to the radar and/or the distance of the target relative to the radar is determined according to the target signal. Since the datum differential frequency signal in the radar signal processing method is a signal obtained by mixing a leakage signal based on the local oscillator signal and performing the digital signal processing in a target free environment, that is, the datum differential frequency signal can represent the strength of the leakage signal in the actual measurement process. Therefore, subtracting the signal to be processed based on the datum differential frequency signal can effectively reduce the content of the leakage signal in the signal to be processed, a proportion of effective echo signal in the target signal is larger, and the accuracy of the measurement results based on the target signal is higher. That is to say, the radar signal processing method provided according to the present disclosure can reduce the impact of the leakage signal on the measurement result, improve the accuracy of the measurement result, the hardware cost, and operation and maintenance cost of the radar can be prevented from being increased while preventing the distance between antennas from being increased and preventing isolation plates from being added.

In order to make the objectives, technical solutions, and advantages of the embodiments of the present disclosure clearer, the technical solutions according to the embodiments of the present disclosure will be described clearly and completely as follows in conjunction with the drawings in the embodiments of the present disclosure. It is apparent that the described embodiments are only a part of the embodiments according to the present disclosure, rather than all of the embodiments. Based on the embodiments of the present disclosure, all other embodiments acquired without creative efforts by those of ordinary skill in the art shall fall within the protection scope of the present disclosure.

The radar signal processing method provided according to the present disclosure may be applied to a FMCW radar, specifically, it may be applied to a controller configured to process echo signals in the FMCW radar, and, of course, it may also be applied to a server on a network side. Reference is made to FIG. 1, which is a flowchart of a radar signal processing method provided according to an embodiment of the present disclosure. The flowchart of the radar signal processing method provided according to the embodiments includes following operations.

In operation s100, an echo signal is mixed based on a local oscillator signal, and digital signal processing is performed to obtain a signal to be processed.

In practical disclosure of a radar, a transmitting antenna of the radar is configured to transmit signals (e.g., electromagnetic waves, ultrasonic waves, etc.), and echo signals are generated after the signals encounter reflectors. Furthermore, a receiving antenna of the radar is configured to receive the echo signals.

The echo signals received by the receiving antenna are analog signals, and which cannot be directly processed by the controller applying the radar signal processing method provided according to the embodiments of the present disclosure. Therefore, after the echo signals received by the receiving antenna are obtained, the echo signals are mixed based on the local oscillator signal (i.e., a transmitting signal of the transmitting antenna) and digital signal processing is performed to obtain the corresponding signal to be processed, the signal to be processed here are discrete time data.

In an exemplary embodiment, the digital signal processing described in the operation 100 includes one or more of an analog digital conversion operation, a sampling operation, a range FFT operation, a doppler FFT operation, and a CFAR operation. In practical disclosures, the specific operations of digital signal processing adopted are different, which will affect the specific implementation process of the subsequent operation s110.

In s110, the signal to be processed is subtracted based on a datum difference frequency signal to obtain a target signal.

As mentioned above, during the operation of the FMCW radar, it is inevitable that the transmitting signal leak directly from the transmitting antenna to the receiving antenna. More importantly, whether there are reflectors in the radar detection direction will not have any impact on the leakage signal.

Based on this, it can be thought that for a certain FMCW radar, its own leakage signals can be regarded as stable. In response to there being no target in the radar detection direction after the signals are transmitted from the transmitting antenna, signals received by the receiving antenna of the radar are all leakage signals. Based on this, in the embodiments of the present disclosure, a signal obtained after the leakage signals are mixed with the local oscillator signal and the same digital signal processing as in operation s100 is performed is taken as the datum differential frequency signal, and the datum differential frequency signal is measured under preset conditions such as a target free environment, that is, there is no reflector in the radar detection direction, that is, the leakage signal can be characterized by the reference differential frequency signal. In the subsequent operations, impact of the leakage signal on the final result can be eliminated or weakened by subtracting operation.

It should be noted that in this embodiment, subtracting the signal to be processed based on the reference difference frequency signal includes removing the reference difference frequency signal contained in the signal to be processed in a predetermined domain (e.g., time domain, frequency domain, angle domain, etc.).

It should also be noted that the reference differential frequency signal may in different characterization forms, and in order to be able to perform subtracting operation, the signal to be processed needs to be converted into the same characterization form as the reference differential frequency signal. An optional execution process of this operation for different characterization forms of the reference differential frequency signal is described as follows.

In some embodiments, the reference differential frequency signal is characterized in the form of time domain signal. The process shown in FIG. 2 may be used in this operation.

In s200, an amplitude difference between the signal to be processed and the datum differential frequency signal at multiple same times is calculated to obtain multiple first subtracted data.

In response to the datum difference frequency signal being characterized in the form of time domain signal, the datum difference frequency signal is characterized by the corresponding signal amplitude at different times. After the above operations, the signal to be processed is also characterized in the form of time domain signal. Therefore, for each time corresponding to the datum differential frequency signal, the amplitude difference between the signal to be processed and the datum differential frequency signal at that time can be calculated, that is, subtract the amplitude of the datum differential frequency signal from the amplitude of the signal to be processed at the same time to obtain the first subtracted data. After traversing all the times corresponding to the datum differential frequency signal, multiple first subtracted data can be obtained.

In s210, each of the multiple first subtracted data is taken as signal data of the signal to be processed at a corresponding time, and the signal to be processed that has been subtracted is taken as the target signal.

The signal composed of the first subtracted data corresponding to different times obtained is the target signal corresponding to this operation.

In other embodiments, the datum differential frequency signal is characterized by the transformation result obtained after range FFT is performed on its time domain waveform, that is, in response to the datum differential frequency signal being characterized in the form of frequency domain signal, the process shown in FIG. 3 may be used in this operation as follows.

In s300, range FFT is performed on the signal to be processed to obtain a first preprocessed signal.

In this case, the first preprocessed signal is a complex signal.

The specific process of performing range FFT on the signal to be processed may refer to the existing FFT method, which will not be detailed here, and the processing result is the first preprocessed signal described in this embodiment.

In s310, complex difference between the first preprocessed signal and the datum frequency difference signal at multiple same frequency points is calculated to obtain multiple second subtracted data.

In response to the datum differential frequency signal is characterized by the transformation result obtained after range FFT is performed on its own time domain waveform, it is specifically identified by the signal amplitude and phase corresponding to different frequency points. Accordingly, the first preprocessed signal obtained by performing range FFT on the signal to be processed is also composed of signal amplitudes and signal phases corresponding to different frequency points.

For each frequency point of the datum differential frequency signal, the complex difference between the first preprocessed signal and the datum differential frequency signal is calculated at a frequency point, that is, subtract the complex number of the reference differential frequency signal from the complex number of the first preprocessed signal at the same frequency point to obtain the second subtracted data. After traversing all the frequency points corresponding to the datum differential frequency signal, multiple second subtracted data is obtained.

In s320, each of the multiple second subtracted data is taken as signal data of the first preprocessed signal at a corresponding frequency point, and the first preprocessed signal that has been subtracted is taken as the target signal.

The second subtracted data corresponding to each frequency point is taken as the signal data of the first preprocessed signal at the corresponding frequency point, and the first preprocessed signal after subtracting operation is the target signal.

Figure 4:
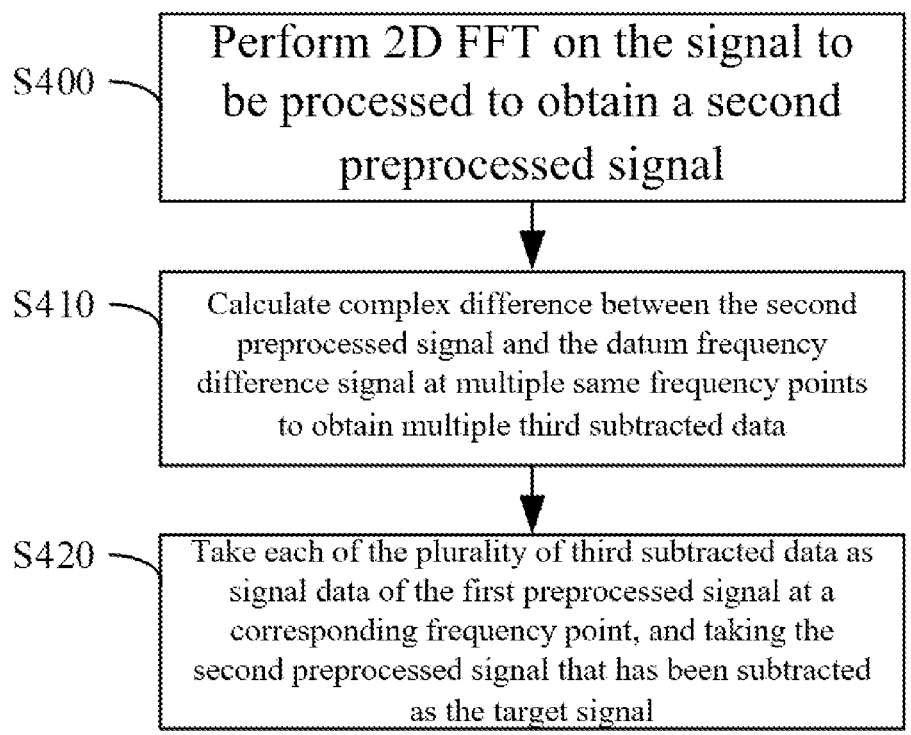
FIG. 4 is a flow chart of yet another process of obtaining the target signal provided according to an embodiment of the present disclosure.

In other embodiments, the datum differential frequency signal is characterized by the transformation result obtained after 2D FFT transformation is performed on its time domain waveform, that is, in response to the datum differential frequency signal is characterized in the form of the frequency domain signal, the process shown in FIG. 4 may be used in this operation.

In s400, 2D FFT is performed on the signal to be processed to obtain a second preprocessed signal.

It should be noted that, in response to the signal to be processed being characterized in the form of time domain signal, performing 2D FFT on the signal to be processed refers to performing range FFT and doppler FFT on the signal to be processed. The result of 2D FFT is the second preprocessed signal. As for the specific implementation process of 2D FFT, reference may be made to the existing FFT technology, which is not limited hereto this embodiment. Accordingly, reference of the specific process of performing 2D FFT on datum difference frequency signal may also be made to the existing FFT technology.

In s410, complex difference between the second preprocessed signal and the datum frequency difference signal at multiple same frequency points is calculated to obtain multiple third subtracted data.

The second preprocessed signal obtained after 2D FFT is characterized by signal amplitudes and signal phases corresponding to different frequency points. Accordingly, the reference difference frequency signal is also characterized by signal amplitudes and signal phases corresponding to different frequency points.

Based on this, for each frequency point of the datum differential frequency signal, the complex difference between the second preprocessed signal and the datum differential frequency signal at a frequency point is calculated, that is, the complex number of the reference differential frequency signal is subtracted from the complex number of the second preprocessed signal at the same frequency point to obtain the third subtraction data. After traversing all the frequency points corresponding to the datum differential frequency signal, all the third subtraction data is obtained.

In s420, each of the multiple third subtracted data is taken as signal data of the first preprocessed signal at a corresponding frequency point, and the second preprocessed signal that has been subtracted is taken as the target signal.

The third subtracted data corresponding to each frequency point is used as the signal data of the second preprocessed signal at the corresponding frequency point, and the second preprocessed signal after subtracting operation is the target signal.

In s120, a travelling speed of a target relative to a radar and/or a distance of the target relative to the radar is determined according to the target signal.

After the operation s100 and operation s110, the content of the leakage signal in the target signal has been effectively reduced, or even eliminated. Therefore, based on the target signal, the travelling speed of the target relative to the radar and/or the distance of the target relative to the radar, the angle (e.g., azimuth and/or elevation angle) of the target relative to the radar can be further determined.

It can be imagined that operation s110 includes multiple implementations for obtaining the target signal, and the final target signal is characterized in different forms. Therefore, in this operation, different specific and optional implementations will be selected according to the specific form of the target signal.

Figure 2:
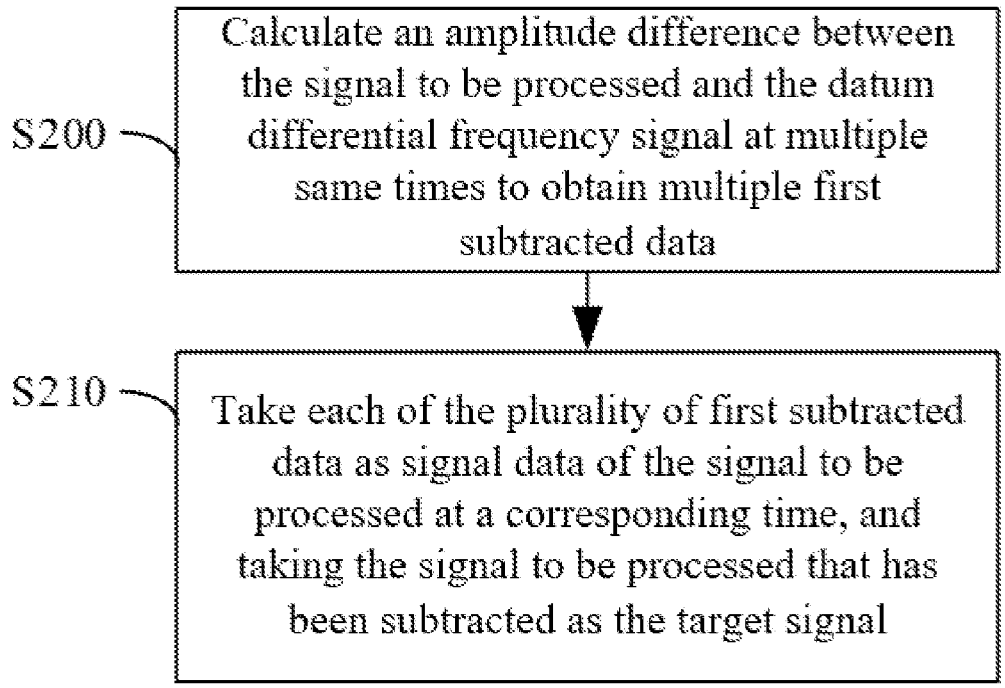
FIG. 2 is a flow chart of a process of obtaining a target signal provided according to an embodiment of the present disclosure.

In an exemplary embodiment, the target signal is obtained after processing based on the method provided according to the embodiment shown in FIG. 2. The target signal is finally characterized in the form of a time-domain signal. First, 2D FFT is performed on the target signal to obtain the first transformation result, and the travelling speed and/or the distance of the target relative to the radar is determined according to the first transformation result.

Figure 3:
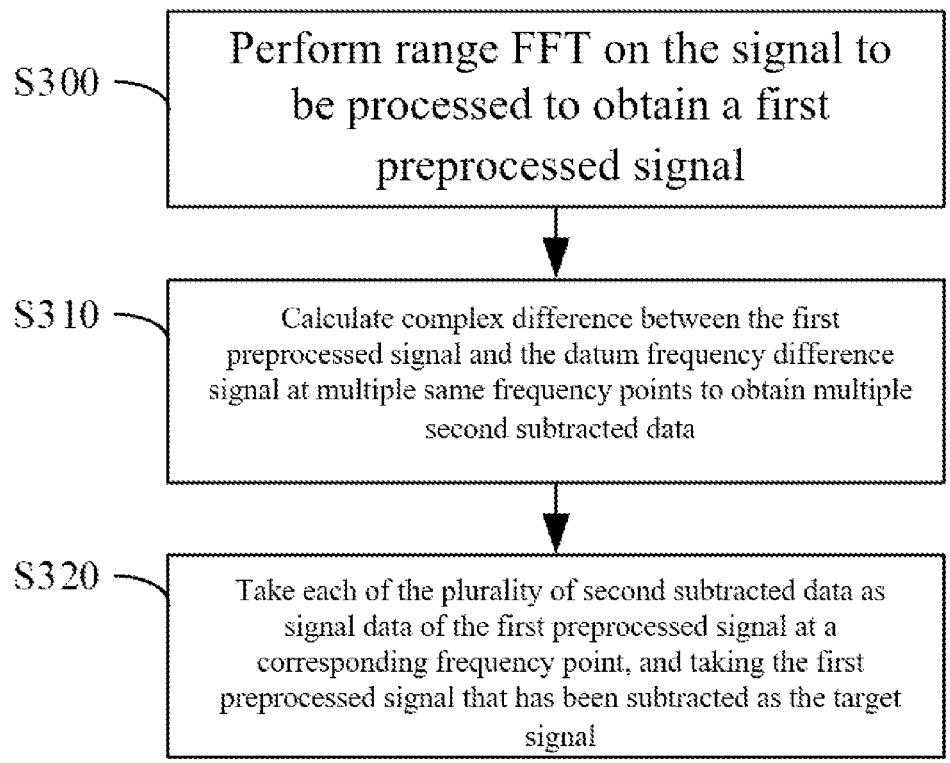
FIG. 3 is a flow chart of another process of obtaining the target signal provided according to an embodiment of the present disclosure.

In an exemplary embodiment, the target signal is obtained after processing based on the method provided according to the embodiment shown in FIG. 3. The target is finally characterized by the result of range FFT. First, range FFT is performed on the target signal to obtain the second transformation result, and the travelling speed and/or the distance of the target relative to the radar is determined according to the second transformation result.

In an exemplary embodiment, the target signal is obtained after processing based on the method provided according to the embodiment shown in FIG. 4, so there is no need to process the target signal, and the travelling speed and/or the distance of the target relative to the radar is determined based on the target signal.

It should be noted that in any of the above embodiments, reference for the process of finally determining the travelling speed and/or the distance of the target relative to the radar may be made to the existing process of determining the travelling speed and/or the distance of the target relative to the radar, which will not be repeated here.

In an exemplary embodiment, after the travelling speed and/or the distance of the target relative to the radar is determined, the azimuth and the pitch angle of the target can also be determined based on the obtained travelling speed and distance.

In summary, the radar signal processing method provided according to the embodiments of the present disclosure can reduce the impact of the leakage signal on the measurement result, improve the accuracy of the measurement result, and prevent the hardware cost and operation and maintenance cost of the radar from being increased while preventing the distance between antennas from being increased and preventing isolation plates from being added.

It should be noted that the radar signal processing method provided according to the embodiment shown in FIG. 1 is mainly used to solve the signal leakage problem of the FMCW radar, which can eliminate the target detection interference caused by the leakage signal. Based on this idea, a radio signal processing method is provided according to the embodiments of the present disclosure, to eliminate all interference signals and/or signals of specific targets in the disclosure scenario, to improve the accuracy of target information determination and wireless communication based on radio signals.

Figure 5:
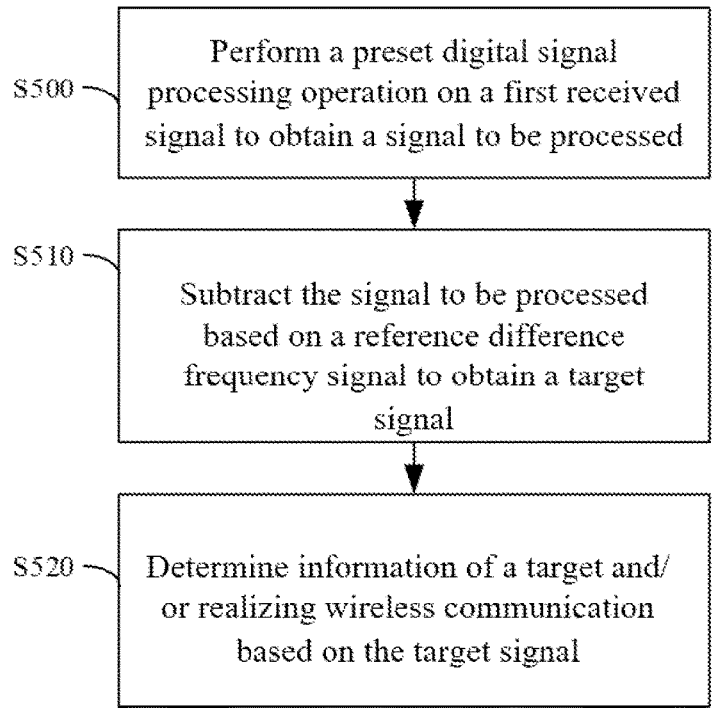
FIG. 5 is a flowchart of a radio signal processing method provided according to an embodiment of the present disclosure.

Reference is made to FIG. 5, which is a flowchart of a radio signal processing method provided according to an embodiment of the present disclosure. The flow chart of the radio signal processing method provided according to the embodiments of the present disclosure includes the following operations.

In s500, a preset digital signal processing operation is performed on a first received signal to obtain the signal to be processed.

The first received signal mentioned in this embodiment mainly refers to other signals used for measuring target information or wireless communication besides the echo signal of the FMCW radar mentioned above. In particular, this embodiment refers to the signal fed back in the corresponding scene, not the signal sent out actively, that is, the signal similar to the echo signal mentioned above.

In an exemplary embodiment, the preset digital signal processing described in the operation 500 includes an analog digital conversion operation, a sampling operation, a range FFT operation, a doppler FFT operation, and a CFAR operation performed sequentially. In practical disclosures, the specific operations can be selected according to actual needs.

In s510, the signal to be processed is subtracted based on a reference difference frequency signal to obtain a target signal.

The reference differential frequency signal is a signal obtained by performing the preset digital signal processing operation on a second received signal in a preset specific environment. The difference between the second received signal and the first received signal is that the first received signal is the signal received in the actual disclosure scenario, and the second received signal is the signal received in the preset specific environment.

As for the preset specific environment corresponding to specific disclosure scenarios, which can be roughly divided into non-target environments or environments with specific targets. For example, the preset specific environment may be an ideal environment such as a dark room, an ideal test site, an outdoor environment where there is no target within the radar measurement range, a highway where there is no vehicle, or a road where there is no vehicles or pedestrians at night.

In practical disclosure, the reference difference frequency signal can be stored in a memory as a template. Following the previous example, a corresponding template includes a self-interference difference frequency template measured based on the ideal test site, such as a environmental interference template measured outdoors in an environment where there is no target within the radar measurement range, and at least one specific target differential frequency template (e.g., the a highway where there is no vehicle, or the road where there is no vehicles or pedestrians at night). The self-interference differential frequency template is used to eliminate various interference signals, including leakage signals, and the environmental interference template is be used to eliminate environmental noise.

Between any two operations of the sampling operation, the range FFT operation, the doppler FFT operation, and the CFAR operation, the target signal is obtained by subtracting the signal to be processed based on the reference difference frequency signal. The specific operation process can be implemented with reference to the previous embodiments, which will not be repeated here.

In s520, information of a target and/or realizing wireless communication is determined based on the target signal.

In an exemplary embodiment, the information of the target includes at least one of distance, velocity, angle, size, shape, surface roughness, dielectric property, and motion path. The specific process of determining the information of the target or realizing wireless communication based on the target signal can be realized with reference to relevant technologies, which will not be detailed here.

In an exemplary embodiment, in response to the first received signal being an echo signal, one of the implementations of the above method is:

mixing an echo signal based on a local oscillator signal, and performing digital signal processing to obtain a signal to be processed;

subtracting the signal to be processed based on a reference difference frequency signal to obtain a target signal; and, determining information of a target and/or realizing wireless communication based on the target signal;

where the reference differential frequency signal is a signal obtained by mixing the second received signal based on the local oscillator signal and performing the preset digital signal processing in the preset specific environment.

The radar signal processing device provided according to the embodiments of the present disclosure is described as follows. The radar signal processing device described below can be considered as functional module architectures to be set in a central device to realize the radar signal processing method provided according to the embodiments of the present disclosure. The following description is cross-referenced with the above method embodiments.

Figure 6:
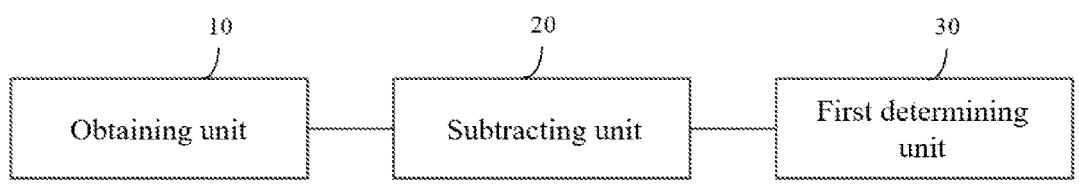
FIG. 6 is a structural block diagram of a radar signal processing device provided according to an embodiment of the present disclosure.

Reference is made to FIG. 6, which 6 is a structural block diagram of a radar signal processing device provided according to an embodiment of the present disclosure. The radar signal processing device provided according to the embodiments includes:

an obtaining unit 10, configured to mix an echo signal based on a local oscillator signal, and performing digital signal processing to obtain a signal to be processed;

a subtracting unit 20, configured to subtract the signal to be processed based on a datum difference frequency signal to obtain a target signal;

a first determining unit 30, configured to determine a travelling speed of a target relative to a radar and/or a distance of the target relative to the radar;

where the datum differential frequency signal is a signal obtained by mixing a leakage signal based on the local oscillator signal and performing the digital signal processing in a target free environment.

In an exemplary embodiment, the datum differential frequency signal is characterized in the form of a time domain signal.

The subtracting unit 20 is configured to subtract the signal to be processed based on the datum difference frequency signal to obtain the target signal, the subtracting unit 20 is specifically configured to:

calculate an amplitude difference between the signal to be processed and the datum differential frequency signal at multiple same times to obtain multiple first subtracted data;

take each of the multiple first subtracted data as signal data of the signal to be processed at a corresponding time, and taking the signal to be processed that has been subtracted as the target signal.

In an exemplary embodiment, the first determining unit 30 is configured to determine the travelling speed of the target relative to the radar and/or the distance of the target relative to the radar, the first determining unit 30 is specifically configured to:

perform 2D FFT on the target signal to obtain a first transformation result;

determine the travelling speed of the target relative to the radar and/or the distance of the target relative to the radar according to the first transformation result.

In an exemplary embodiment, the datum differential frequency signal is characterized by the transformation result obtained by performing range FFT on the time domain waveform of the datum differential frequency signal.

The subtracting unit 20 is configured to subtract the signal to be processed based on the datum difference frequency signal to obtain the target signal, the subtracting unit 20 is specifically configured to:

perform range FFT on the signal to be processed to obtain a first preprocessed signal;

calculate complex difference between the first preprocessed signal and the datum frequency difference signal at multiple same frequency points to obtain multiple second subtracted data;

take each of the multiple second subtracted data as signal data of the first preprocessed signal at a corresponding frequency point, and taking the first preprocessed signal that has been subtracted as the target signal.

In an exemplary embodiment, the first determining unit 30 is configured to determine the travelling speed of the target relative to the radar and/or the distance of the target relative to the radar, the first determining unit 30 is specifically configured to:

perform doppler FFT on the target signal to obtain a second transformation result;

determine the travelling speed of the target relative to the radar and/or the distance of the target relative to the radar according to the second transformation result.

In an exemplary embodiment, the datum differential frequency signal is characterized by the transformation result obtained after 2D FFT is performed on time domain waveform of the datum differential frequency signal.

The subtracting unit 20 is configured to subtract the signal to be processed based on the datum difference frequency signal to obtain the target signal, the subtracting unit 20 is specifically configured to:

perform 2D FFT on the signal to be processed to obtain a second preprocessed signal;

calculate complex difference between the second preprocessed signal and the datum frequency difference signal at multiple same frequency points to obtain multiple third subtracted data;

take each of the multiple third subtracted data as signal data of the first preprocessed signal at a corresponding frequency point, and taking the second preprocessed signal that has been subtracted as the target signal.

Figure 7:
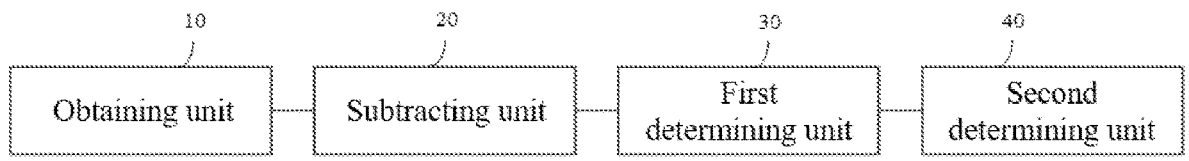
FIG. 7 is a structural block diagram of another radar signal processing device provided according to an embodiment of the present disclosure.

In an exemplary embodiment, reference is made to FIG. 7, which is a structural block diagram of another radar signal processing device provided according to an embodiment of the present disclosure. Based on of the embodiment shown in FIG. 6, the radar signal processing device further includes a second determining unit 40, which is configured to determine an azimuth of the target according the travelling speed of the target relative to the radar and/or the distance of the target relative to the radar.

An integrated circuit is further provided according to the embodiments of the present disclosure, the integrated circuit includes:

a storage module, configured to store a datum differential frequency signal or a reference differential frequency signal in advance;

a digital signal processing module, configured to call the datum differential frequency signal from the storage module to perform the radar signal processing method according to any one of the first aspect of the present disclosure to eliminate signal leakage interference, or call the reference differential frequency signal from the storage module to perform the radar signal processing method according to any one of the third aspect of the present disclosure to eliminate specific target signals and/or interference signals.

In an exemplary embodiment, the integrated circuit is a millimeter wave radar chip.

A radio device is provided according to the embodiments of the present disclosure, the radio device includes:

a carrier;

an integrated circuit, where the integrated circuit is the integrated circuit according to the fourth aspect of the present disclosure, and the integrated circuit is arranged on the carrier; and an antenna, where the antenna is arranged on the carrier, or the antenna is integrated with the integrated circuit to form an integrated device, and the integrated device is arranged on the carrier; the integrated circuit is connected to the antenna, to transmit and receive radio signals.

In an exemplary embodiment, a device is provided according to the present disclosure, the device includes:

device main body; and a radio device, where the radio device is the radio device according to the fifth aspect of the present disclosure, and the radio device is arranged on the device main body;

where the radio device is configured to perform target detection and/or communication.

The technical solutions in the present disclosure are described in detail below with specific examples.

FIG. 8 to FIG. 16 are schematic views of signal processing performed based on a FMCW millimeter wave radar.

Figure 8:
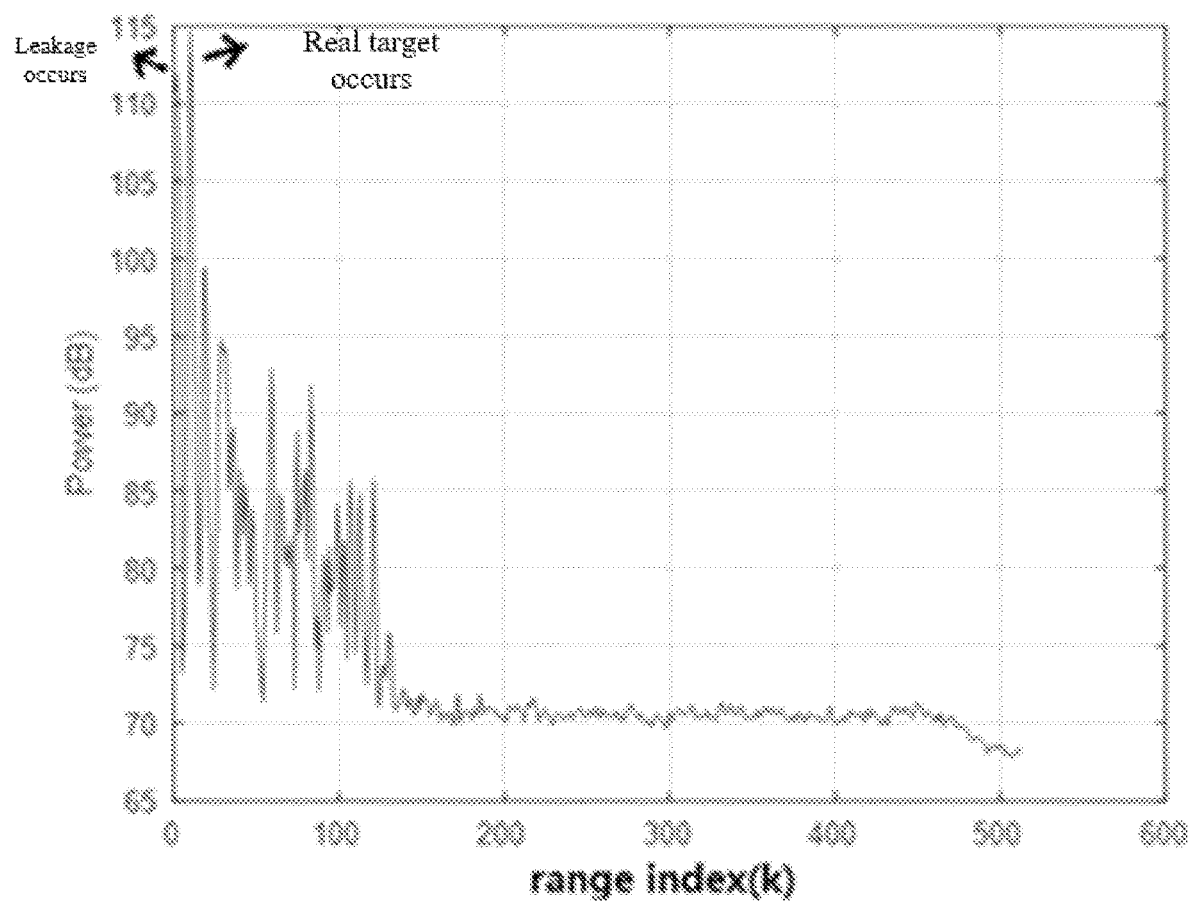
FIG. 8 to FIG. 16 are schematic views of signal processing performed based on a FMCW millimeter wave radar.

A FMCW radar, as a sensor that can provide accurate range measurement and ultra-high range resolution, has been widely applied to many fields in recent years. However, since the FMCW radar inevitably has the problem of transmitting signals (e.g., local oscillator signals) leaking directly from a transmitting end to a receiving end. In response to the FMCW sweeping fast enough, the leaking signal from the transmitting end to the receiving end will have a frequency difference with the local oscillator signal due to a certain time delay caused by the leakage path. Generally, the energy of the leaking signal is strong, and the frequency difference with the local oscillator signal is small. After mixing, a signal with strong energy will be generated near direct current (DC). As shown in FIG. 8, in response to an existing FMCW radar detecting at close range, the leakage signal will generate strong false targets at close range, which brings great difficulties to the FMCW radar for performing detection of close-range targets. In FIG. 8, the horizontal axis is a range index, and the vertical axis is the power index.

For the problem shown in FIG. 8, the applicant creatively proposed the technical solutions provided according to the embodiments of the present disclosure to effectively solve the problem, which effectively suppresses or even completely eliminates the close-range false targets generated by transmission leakage in the FMCW radar, without changing the distance between the existing receiving antenna and the transmitting antenna and beam characteristics, and without adding any circuit structure. It is only necessary to obtain the time domain waveform of the difference frequency signal after the leakage signal is mixed with the local oscillator signal in the baseband measurement, and simple signal processing methods is performed, so that the leakage signal can be suppressed, and the detection accuracy of the FMCW radar for close-range targets due to leakage and other factors can be improved.

Figure 9:
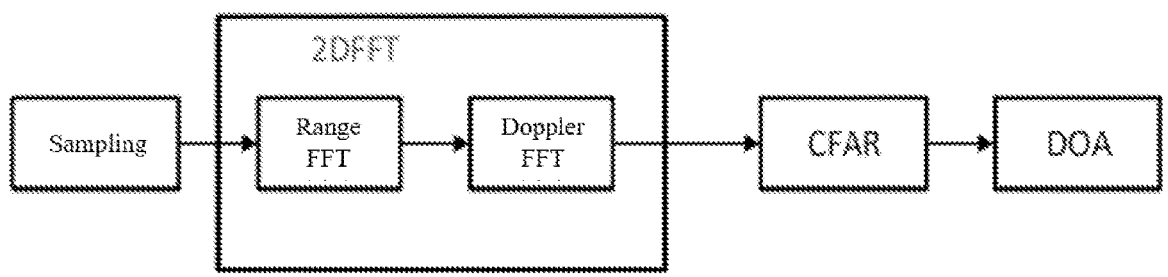

FIG. 9 is a flow chart of digital baseband signal processing at the receiving end of a conventional FMCW radar. That is, a sampling module is configured to extract valid data in all chirps from discrete time data after an analog digital conversion (ADC) module. The valid data enters a 2D FFT module, which includes two sub modules, namely, range FFT and doppler FFT are performed sequentially. In each chirp, an FFT is performed in advance. Since frequency information mainly generated by the target range can be obtained in this FFT, it is also referred to as range FFT. All chirps of the same range gate will undergo another FFT, in which frequency information generated by the target motion is obtained, it is also referred to as doppler FFT.

The range and/or speed information of the target can be obtained from the frequency domain data obtained by the 2D FFT module and the CFAR module arranged in sequence. A direction of arrival (DOA) module is configured to calculate angle information of the target according to 2D FFT value corresponding to the range/speed of the target.

Figure 10:
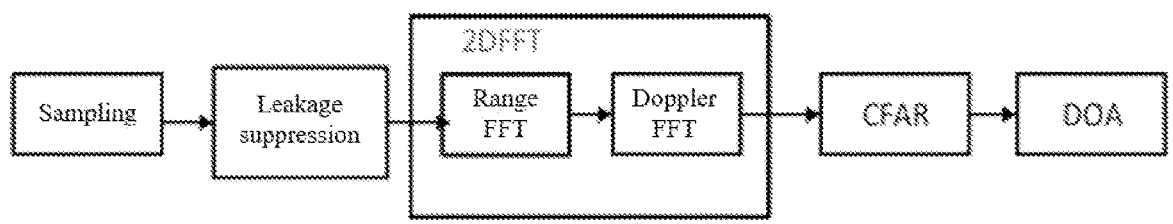
Figure 11:
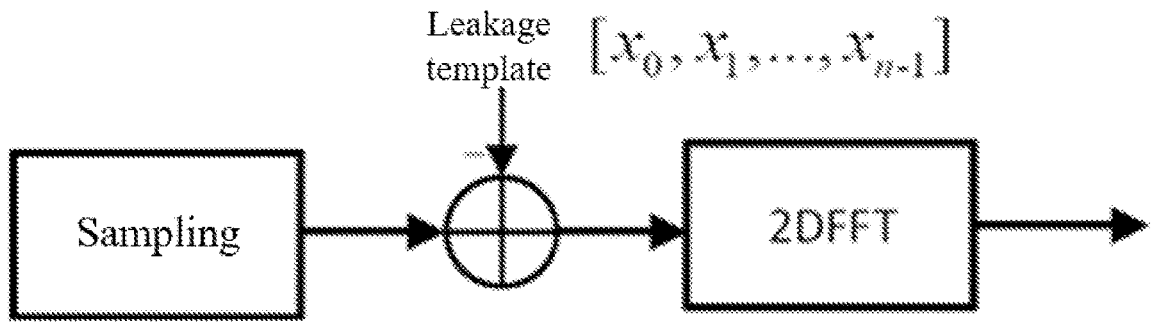
Figure 12:
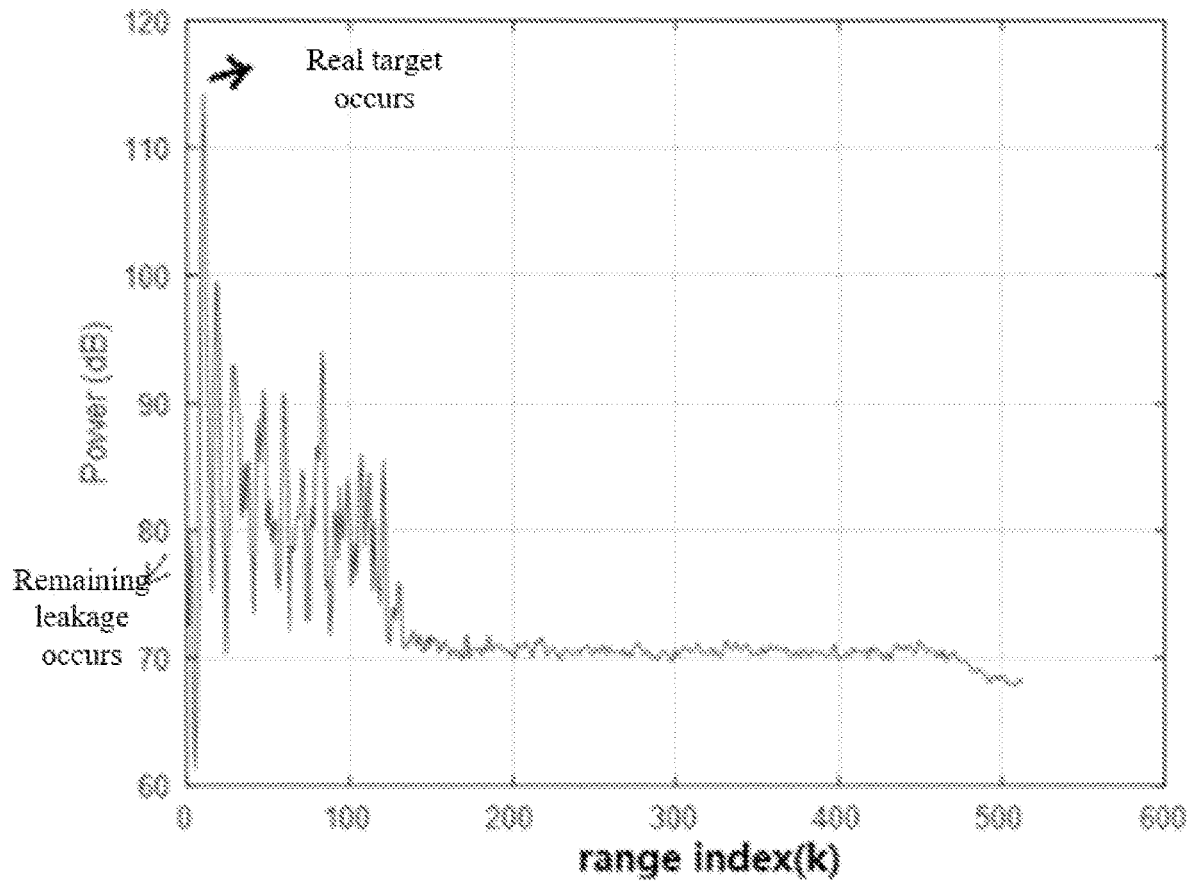

FIG. 10 is a flow chart of digital baseband signal processing of a receive end of the FMCW radar with time domain leakage suppression function. FIG. 11 is a flow chart of specific implementation of time domain leakage suppression. The leak template in FIG. 11 represents the time domain waveform of the difference frequency signal after the measured leak signal and local oscillator signal are mixed. It is discrete time data after the ADC module. The length n is equal to the number of valid data in a chirp, which can be measured in advance in an environment without targets, and can be stored in the memory.

As shown in FIG. 10 and FIG. 11, the leakage template in this case is $[x_0, x_1, \ldots, x_{n-1}]$, that is, $x_0, x_1, \ldots, x_{n-1}$ is used to characterize the amplitude value of the signal corresponding to each sampling time, that is, they are all real numbers, and n is the sampling serial number. The data processing flow of the time-domain leak suppression module is as follows: the sampling module is configured to extract valid data in all chirps. The data in each chirp needs to be subtracted from the corresponding data in the leak template in the time-domain leak suppression module, and the data in each chirp enters the 2D FFT module. The subsequent processing flow remains unchanged. The difference frequency signal after the leakage signal and local oscillator signal in the data are mixed done by the time-domain suppression leakage module will be greatly weakened. After the 2D FFT, there will be no strong signal near the DC. After the above processing, the signal shown in FIG. 8 can be processed as the signal shown in FIG. 12. Compared with FIG. 8 and FIG. 12, it can be seen that the technical solution in this embodiment can reduce the leakage to more than 30 dB, which will greatly improve the capability of the radar to detect close-range targets.

Figure 13:
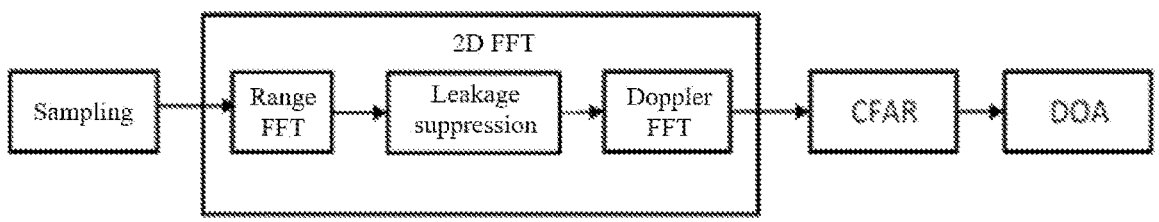
Figure 14:
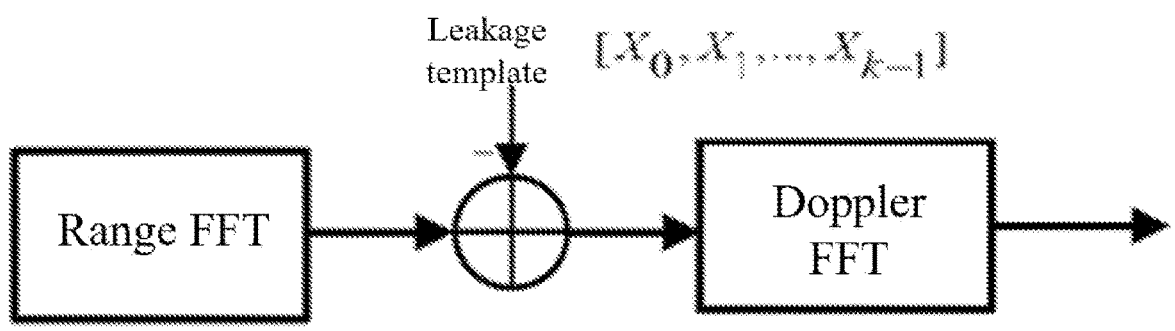

Based on the above embodiments, as shown in FIG. 13, the above processing can also be carried out during the 2D FFT to suppress leakage signals, that is, FIG. 13 is a flow chart of digital baseband signal processing at a receiving end of the FMCW radar with frequency domain leakage suppression function. FIG. 14 is a block diagram of specific implementation corresponding to the frequency domain leakage suppression in FIG. 13. In this case, the leakage template in FIG. 14 represents the result of range FFT of the time domain waveform of the difference frequency signal after the measured leakage signal is mixed with the local oscillator signal (in response to the signal being windowed before the range FFT, the leakage template is also the result of the time domain waveform of the difference frequency signal after the same windowing and FFT in sequence). The length k of the leakage template can be determined according to the bandwidth of the difference frequency signal, which is generally far less than the length of the effective data of a chirp, so the memory space consumed is far less than the time domain leakage suppression. The leak template can be measured in advance in an environment without targets and stored in memory. That is, the leakage template at this time is $[X_0, X_1, \ldots, X_1, \ldots, X_{k-1}]$, that is, $X_0, X_1, \ldots, X_{k-1}$ is used to characterize the complex signal corresponding to each frequency point. The complex signal at each frequency point contains the amplitude value and phase value of the signal at this time, that is, X is a complex number.

As shown in FIG. 13 and FIG. 14, the data processing flow of the frequency domain leak suppression module is as follows: after a FFT (range FFT) is performed once on the time domain data in each chirp, the first k range FFT results need to be subtracted from the corresponding data in the leak template in the frequency domain leak suppression module, and the doppler FFT is performed subsequentially. Similarly, the difference frequency signal after the leakage signal and the local oscillator signal in the data is mixed done by the frequency domain suppression leakage module will be greatly weakened. After the 2D FFT, there will be no strong signals near the DC, which can improve the capability of the radar to detect close-range targets.

Figure 15:
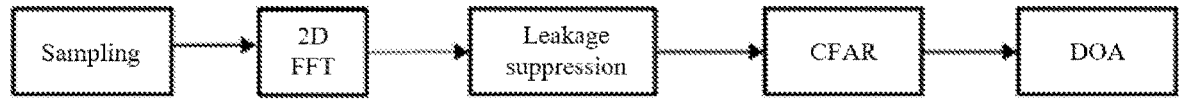
Figure 16:
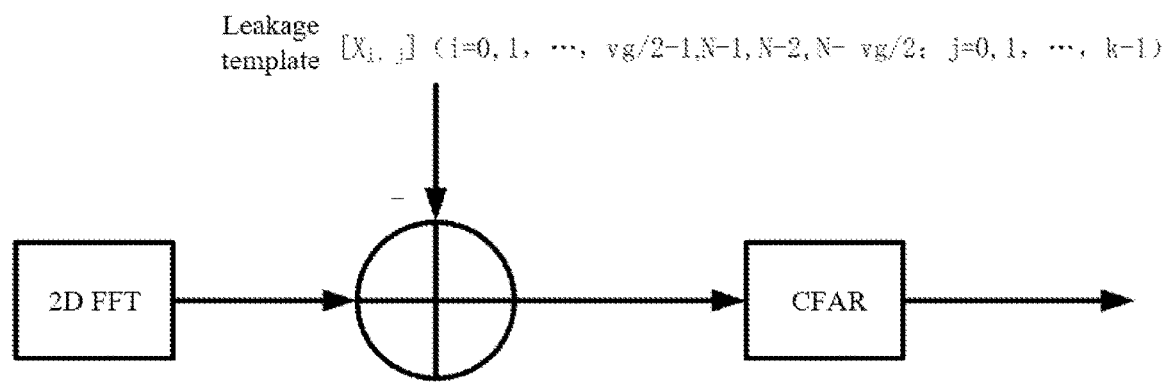

In another exemplary embodiment, based on the above similar ideas, the frequency domain leakage suppression can be realized after the 2D FFT:

FIG. 15 is a flow chart of digital baseband signal processing of another receiving end of the FMCW radar with frequency domain leakage suppression function. FIG. 16 is a block diagram corresponding to the frequency domain suppression module shown in FIG. 15. The leakage template in FIG. 16 represents the result of the time domain waveform of the difference frequency signal after the measured leakage signal is mixed with the local oscillator signal after 2D FFT (in response to the signal being windowed before the range FFT, the leakage template is also the result of the time domain waveform of the difference frequency signal after the same windowing and FFT in sequence). After the 2D FFT, any single frequency signal will expand not only along the range gate, but also along the doppler gate. Therefore, in this case, the leak template not only includes FFT results at speed 0, but also includes FFT results extended to other speeds. Expansion width $v_g$ along the range gate and expansion width k along the range gate can be determined according to the 2D FFT result of the difference frequency signal. The leak template can be measured in advance in an environment without targets and stored in memory. That is, the leakage template in this case is $[X_{i,j}]$ ($i=0, 1, \ldots, v_g/2-1, N-1, N-2, N-v_g/2; j=0, 1, \ldots, k-1$). N represents the number of points in the doppler FFT, that is, $X_{i,j}$ is used to characterize the complex signal corresponding to each frequency point, and the complex signal of each frequency point contains the amplitude value and phase value of the signal at this time.

In the above embodiments, based on of the existing transceiver antenna design and radio frequency (intermediate frequency) structure, the time-domain waveform (leakage template) of the difference frequency signal after the leakage signal is mixed with the local oscillator signal can be obtained through baseband measurement. The time-domain waveform is stored, and simple signal processing methods are implemented, to suppress the leakage signal, thereby improving the capability of the FMCW radar to detect close-range targets. This method has a small amount of calculation, only simple subtraction calculation. In response to using frequency domain to suppress leakage, the memory space occupied is very small, and the real-time performance can also be guaranteed.

The above embodiments are described in a progressive manner. Each of the embodiments is mainly focused on describing its differences from other embodiments, and reference may be made among these embodiments with respect to the same or similar parts. For the device disclosed in the embodiments, since the device corresponds to the method disclosed in the embodiments, the description of the device is relatively simple, reference may be made to the description of the method for details.

The person skilled in the art can further realize that the units and algorithm operations of each example described in combination with the embodiments disclosed herein can be implemented in electronic hardware, computer software, or a combination of the two. In order to clearly explain the interchangeability of hardware and software, the composition and operations of each example have been generally described in the above description according to their functions. Whether these functions are implemented in hardware or software depends on the specific disclosure and design constraints of the technical solution. The person skilled in the art can use different methods for each specific disclosure to realize the described functions, but such implementation should not be considered beyond the scope of the present disclosure.

The operations of the method or algorithm described in conjunction with the embodiments disclosed herein can be directly implemented by hardware, a software module executed by a processor, or a combination of the hardware and the software module. The software module may be placed in a random-access memory (RAM), a memory, a read-only memory (ROM), an electrically programmable ROM, an electrically erasable programmable ROM, a register, a hard disk, a removable disk, a CD-ROM, or any other form of storage medium known in the technical field.

The above illustration of the disclosed embodiments can enable those skilled in the art to implement or use the present disclosure. Various modifications to the embodiments are apparent to the person skilled in the art, and the general principle herein can be implemented in other embodiments without departing from the spirit or scope of the present disclosure. Therefore, the present disclosure is not limited to the embodiments described herein, but should be in accordance with the broadest scope consistent with the principle and novel features disclosed herein.

What is claimed is:

1. A radar signal processing method, comprising:
    transmitting, by a transmitting antenna of a radar, radio signals to a target, the radio signals being based on a local oscillator signal;
    receiving, by a receiving antenna of the radar, echo signals from the target reflecting the radio signals;
    mixing the echo signal with the local oscillator signal to obtain a first mixed signal, and performing digital signal processing on the first mixed signal to obtain a signal to be processed;
    subtracting a datum difference frequency signal from the signal to be processed to obtain a target signal; and,
    determining a travelling speed of the target relative to the radar and/or a distance of the target relative to the radar according to the target signal;
    wherein the datum difference frequency signal is obtained by mixing a leakage signal with the local oscillator signal to obtain a second mixed signal and performing digital signal processing on the second mixed signal, the leakage signal corresponding to a signal received by the receiving antenna of the radar in a target free environment, and wherein the datum difference frequency signal is stored before being used to obtain the target signal.

2. The radar signal processing method according to claim 1, wherein the datum difference frequency signal is a time domain signal;
    subtracting the datum difference frequency signal from the signal to be processed to obtain the target signal comprises:
    calculating an amplitude difference between the signal to be processed and the datum difference frequency signal at a plurality of time points to obtain a plurality of first subtracted data;
    taking each of the plurality of first subtracted data as signal data of the signal to be processed at a corresponding time, and taking the signal to be processed that has been subtracted as the target signal.

3. The radar signal processing method according to claim 2, wherein determining the travelling speed of the target relative to the radar and/or the distance of the target relative to the radar according to the target signal comprises:
    performing two-dimensional fast Fourier transform (2D FFT) on the target signal to obtain a first transformation result;
    determining the travelling speed of the target relative to the radar and/or the distance of the target relative to the radar according to the first transformation result.

4. The radar signal processing method according to claim 1, wherein in response to the datum difference frequency signal being characterized by transformation result obtained after range FFT is performed on time domain waveform of the datum difference frequency signal,
    subtracting the datum difference frequency signal from the signal to be processed to obtain the target signal comprises:
    performing range FFT on the signal to be processed to obtain a first preprocessed signal;
    subtracting the datum frequency difference signal from the first preprocessed signal at a plurality of same frequency points to obtain complex difference serving as a plurality of second subtracted data;
    taking each of the plurality of second subtracted data as signal data of the first preprocessed signal at a corresponding frequency point, and taking the first preprocessed signal that has been subtracted as the target signal.

5. The radar signal processing method according to claim 4, wherein determining the travelling speed of the target relative to the radar and/or the distance of the target relative to the radar according to the target signal comprises:
    performing doppler FFT on the target signal to obtain a second transformation result;
    determining the travelling speed of the target relative to the radar and/or the distance of the target relative to the radar according to the second transformation result.

6. The radar signal processing method according to claim 1, wherein in response to the datum difference frequency signal being characterized by transformation result obtained after 2D FFT is performed on time domain waveform of the datum difference frequency signal,
subtracting the datum difference frequency signal from the signal to be processed to obtain the target signal comprises:
performing 2D FFT on the signal to be processed to obtain a second preprocessed signal;
subtracting the datum frequency difference signal from the second preprocessed signal at a plurality of same frequency points to obtain complex difference serving as a plurality of third subtracted data;
taking each of the plurality of third subtracted data as signal data of the second preprocessed signal at a corresponding frequency point, and taking the second preprocessed signal that has been subtracted as the target signal.

7. The radar signal processing method according to claim 1, further comprising:
determining an azimuth of the target according the travelling speed of the target relative to the radar and/or the distance of the target relative to the radar.

8. A radar signal processing device, comprising:
an obtaining unit, configured to mix an echo signal from a target with a local oscillator signal to obtain a first mixed signal, and performing digital signal processing on the first mixed signal to obtain a signal to be processed;
a subtracting unit, configured to subtract a datum difference frequency signal from the signal to be processed to obtain a target signal; and
a first determining unit, configured to determine a travelling speed of the target relative to a radar and/or a distance of the target relative to the radar according to the target signal;
wherein the datum difference frequency signal is a signal obtained by mixing a leakage signal with the local oscillator signal to obtain a second mixed signal and performing the digital signal processing on the second mixed signal, the leakage signal corresponding to a signal received by a receiving antenna of a radar in a target free environment, and wherein the datum difference frequency signal is stored before being used to obtain the target signal.

9. A radio signal processing method, comprising:
receiving a first received signal fed back from a target at a receiving antenna of a radar,
performing a preset digital signal processing operation on the first received signal to obtain a signal to be processed; and
subtracting a reference difference frequency signal from the signal to be processed to obtain a target signal;
wherein the reference difference frequency signal is a signal obtained by performing the preset digital signal processing operation on a second received signal, the second received signal corresponding to a signal received by the receiving antenna in a preset specific environment, and wherein the reference difference frequency signal is stored before being used to obtain the target signal.

10. The radio signal processing method according to claim 9, wherein the first received signal is an echo signal of the target, and the radio signal processing method comprises:
mixing the echo signal with a local oscillator signal to obtain a first mixed signal, and performing digital signal processing on the first mixed signal to obtain the signal to be processed;
subtracting the reference difference frequency signal from the signal to be processed to obtain the target signal; and,
determining information of the target based on the target signal;
wherein the reference difference frequency signal is a signal obtained by mixing the second received signal with the local oscillator signal to obtain a second mixed signal and performing the preset digital signal processing on the second mixed signal.

11. The radio signal processing method according to claim 9, wherein the preset digital signal processing operation comprises an analog-to-digital conversion operation, a sampling operation, a range FFT operation, a doppler FFT operation, and a CFAR operation performed sequentially;
wherein between any two operations of the sampling operation, the range FFT operation, the doppler FFT operation, and the CFAR operation, the target signal is obtained by subtracting the reference difference frequency signal from the signal to be processed.

12. The radio signal processing method according to claim 10, wherein the information of the target comprises at least one of distance, velocity, angle, size, shape, surface roughness, dielectric property, and motion path.

13. The radio signal processing method according to claim 11, wherein the information of the target comprises at least one of distance, velocity, angle, size, shape, surface roughness, dielectric property, and motion path.

14. The radio signal processing method according to claim 9, wherein the preset specific environment is a target free environment or an environment with specific interference.

15. An integrated circuit, comprising:
a storage module, configured to store a datum difference frequency signal in advance;
a digital signal processing module, configured to call the datum difference frequency signal from the storage module and to perform the radar signal processing method according to claim 1 to eliminate signal leakage interference.

16. A radio device, comprising:
a carrier;
an integrated circuit, wherein the integrated circuit is the integrated circuit according to claim 15, and the integrated circuit is arranged on the carrier; and
an antenna, wherein the antenna is arranged on the carrier, or the antenna is integrated with the integrated circuit to form an integrated device, and the integrated device is arranged on the carrier;
the integrated circuit is connected to the antenna, to transmit and receive radio signals.

17. A device, comprising:
a device main body; and
a radio device, wherein the radio device is the radio device according to claim 16, and the radio device is arranged on the device main body;
wherein the radio device is configured to perform target detection and/or communication.

18. An integrated circuit, comprising:
a storage module, configured to store a reference difference frequency signal in advance;
a digital signal processing module, configured to call the reference difference frequency signal from the storage module and to perform the radar signal processing method according to claim 9 to eliminate specific interference signals in the preset specific environment.

19. A radio device, comprising:
a carrier;
an integrated circuit, wherein the integrated circuit is the integrated circuit according to claim 18, and the integrated circuit is arranged on the carrier; and
an antenna, wherein the antenna is arranged on the carrier, or the antenna is integrated with the integrated circuit to form an integrated device, and the integrated device is arranged on the carrier;
the integrated circuit is connected to the antenna, to transmit and receive radio signals.

* * * * *